United States Patent [19]
Freling et al.

[11] Patent Number: 5,921,751
[45] Date of Patent: Jul. 13, 1999

[54] COATING SCHEME TO CONTAIN MOLTEN MATERIAL DURING GAS TURBINE ENGINE FIRES

[75] Inventors: Melvin Freling, West Hartford; Dinesh K. Gupta, South Windsor, both of Conn.

[73] Assignee: United Technologies Corporation, Hartford, Conn.

[21] Appl. No.: 08/575,116

[22] Filed: Dec. 19, 1995

Related U.S. Application Data

[63] Continuation of application No. 08/197,042, Feb. 16, 1994, abandoned.

[51] Int. Cl.⁶ ........................................... F04D 29/44
[52] U.S. Cl. ............................... 415/200; 415/177
[58] Field of Search ...................... 415/200, 177; 428/632, 633

[56] References Cited

U.S. PATENT DOCUMENTS

| | | | |
|---|---|---|---|
| 3,918,925 | 11/1975 | McComas . | |
| 3,951,612 | 4/1976 | Gates et al. . | |
| 4,037,751 | 7/1977 | Miller et al. | 220/9 R |
| 4,055,705 | 10/1977 | Stecura et al. | 428/633 |
| 4,155,680 | 5/1979 | Linko, II et al. | 415/144 |
| 4,247,249 | 1/1981 | Siemers | 415/174 |
| 4,269,903 | 5/1981 | Clingman | 428/633 |
| 4,273,824 | 6/1981 | McComas | 415/200 |
| 4,289,447 | 9/1981 | Sterman et al. | 415/200 |
| 4,535,033 | 8/1985 | Stecura | 428/633 |
| 4,642,027 | 2/1987 | Popp | 415/177 |
| 4,659,282 | 4/1987 | Popp | 415/177 |
| 4,715,178 | 12/1987 | Tsukuda et al. | 60/272 |
| 4,838,030 | 6/1989 | Cramer | 60/753 |
| 4,916,022 | 4/1990 | Solfest et al. | 428/633 |
| 4,966,820 | 10/1990 | Kijima et al. | 428/633 |
| 5,185,217 | 2/1993 | Miyamoto et al. | 415/200 |

FOREIGN PATENT DOCUMENTS

| | | |
|---|---|---|
| 0 186 266 | 10/1985 | European Pat. Off. . |
| 0 266 299 | 10/1987 | European Pat. Off. . |
| 0 322 812 | 12/1988 | European Pat. Off. . |
| 0 388 520 | 4/1989 | European Pat. Off. . |
| 4015010C1 | 11/1991 | Germany . |

*Primary Examiner*—John T. Kwon
*Attorney, Agent, or Firm*—Zackery Legal Group

[57] ABSTRACT

In a gas turbine engine, a method and apparatus for containing molten materials and ignited titanium and titanium alloys within the confines of the turbine engine environment. The method includes the step of first applying a bond coating to the inner surface of the outer compressor casing. The bond coating is then plasma oversprayed with a non-reactive, thermally insulative ceramic top coating. The apparatus includes a substrate having a bond coating and a ceramic top coating, surrounding at least a portion of the gas turbine engine, for containing turbine engine fires within the turbine engine environment. Preferably, the bond coating is a Ni—Co—Cr—Al—Y alloy, and the top coat is stabilized zirconia.

20 Claims, 4 Drawing Sheets ns may be higher than the temperature of the molten
COATING SCHEME TO CONTAIN MOLTEN MATERIAL DURING GAS TURBINE ENGINE FIRES This application is a continuation of application Ser. No. 08/197,042, filed Feb. 16, 1994, the benefit of the filing dates of which are hereby claimed under 35 USC 120, now abandoned.

BACKGROUND OF THE INVENTION

1. Field of the Invention

The present invention relates generally to gas turbine engines, and more specifically, to coatings used to contain molten material within the core of the turbine engine.

2. Description of the Prior Art

The Federal Aviation Administration (FAA) requires that in the event of turbine engine fires, molten materials be confined, as much as possible, within the core of the turbine engine. This requirement is a necessary precautionary measure to insure that other aircraft components located both within and outside the confines of the turbine engine environment, such as fuel cells, flight control linkages and surfaces (including hydraulic control systems) are not exposed to molten materials that are expelled from the turbine engine. To meet this requirement, it is generally necessary to include shields, drip pans, blankets and other confining structures surrounding potentially hazardous areas of the turbine engine. These structures are specifically designed to stop and/or to cool molten materials coming into contact with the confining structures.

Improvement in the weight-to-performance characteristics of a turbine engine involves, in part, decreasing engine weight without sacrificing the strength and structural integrity of engine components, and thus, of the engine as a whole. To this end, titanium alloys have been incorporated in modern turbine engine components. Titanium is generally considered lighter in weight and relatively strong as compared to nickel alloys, which have also been used extensively in turbine engines. However, because titanium and titanium alloys would likely ignite if exposed to the high temperatures or pressures present in hot sections of the gas turbine engine, such as the high pressure compressor section of the engine, the use of titanium is limited to the cooler regions of the turbine engine. Use of titanium in hotter portions of the turbine engine would increases the probability of titanium ignition and would thus increase the need for additional safety devices to insure containment of potential engine fires.

The turbine engine temperature profile is progressive, in that it increases from a relatively low temperature at the engine intake to a much hotter temperature at the burner/turbine section of the engine and then decreases slightly to a temperature that is still relative high, at the engine exhaust. A median threshold temperature exists within the temperature profile of a turbine engine, at which titanium and titanium alloys, if located close to a portion of the engine that is at the median threshold temperature, would likely ignite, thereby causing a catastrophic engine failure. The median threshold temperature point may migrate longitudinally within the engine, due to changes in engine power demands, changes in the efficiency of the engine (i.e., engines that have been operated for many hours since overhaul versus engines that were recently overhauled may have a relocated temperature threshold), and minor malfunctions that may occur, including fan blade, turbine blade, or bearing failures, or due to aerodynamic heating.

Since titanium is employed in compressor rotors, stators, and casings (inner and outer) that can be located relatively close to the median threshold temperature point, drip pans are customarily used in these sections to contain molten titanium and other materials in the event of fire or overheating. The pans surround areas of the engine that could overheat and thereby expel molten materials through bleed holes in the compressor section. Bleed holes are used for drawing off compressed air for various aircraft systems, including hot air for deicing, and hot or cool air for aircraft cabin comfort. The pans are generally made of a material having a melting temperature substantially above the anticipated temperature of the molten material that may contact the pans. However, although the melting temperature of the pans may be higher than the temperature of the molten materials that can contact the pans, if the pan mass is insufficient, the molten material may soften and eventually burn through the pan. Once through the pan, the molten material may burn through the compressor casing, escaping the confines of the turbine engine.

The additional weight and bulk of safety devices such as steel drip pans increase the weight and size of the engine. This increased weight in turn affects the performance and efficiency of the aircraft on which the engine is installed. Accordingly, use of metal drip pans is contrary to the goal of reducing total engine weight to achieve increased aircraft economy and performance. In addition, where modern turbine engines with improved performance and economy of operation are desired for use on smaller aircraft, the elimination of steel drip pans may make what would otherwise be dimensionally too large an engine, sufficiently small to be used on a smaller aircraft. This advantage may be especially important in retrofitting a newer engine to an older aircraft that has a limited size engine compartment.

Accordingly, there is a need for a method and apparatus to contain molten materials within the turbine engine environment without adding significant weight to the engine and without requiring the space associated with conventional safety devices.

SUMMARY OF THE INVENTION

The present invention provides a method and apparatus for containing molten materials within the confines of a turbine engine. This invention also reduces the weight of the engine by minimizing the use of conventional safety devices such as drip pans, and further aids in reducing the physical dimension of at least portions of the engine by not using the space needed for those safety devices.

In accordance with the present invention, an insulative protective coating is applied to the inner surface of the outer compressor casing. The coating is preferably applied in areas of the engine wherein there is a higher probability of molten materials that might be expelled from the engine core contacting the outer casing. The protective coating prevents the outer casing from reaching a threshold temperature sufficient that the molten material could burn through the outer casing, or ignite the outer casing if the casing includes titanium and/or titanium alloys, or other ignitable materials.

The protective coating of the present invention preferably includes materials capable of withstanding significantly higher temperatures than those temperatures associated with molten materials expelled from the engine, and higher temperatures than those which would ignite or cause burn through of the compressor casing. In addition, the coating is preferably non-reactive with the outer casing and with any molten materials that may come to rest on the inner surface of the outer casing. The protective coating of the present invention, as applied to the inner surface of the outer casing, becomes part of the outer casing so that molten materials congeal on the casing surface, in contrast to conventional drip pans and other safety devices that are separate and apart from the outer casing. Such containment structures generally provide a thermal air space between the safety device and the outer casing. The present invention prevents the molten materials from increasing the casing temperature sufficiently to burn through or ignite the outer casing.

In a preferred embodiment of the present invention, a bond coating is initially applied to a substrate. The bond coating provides adhering properties for a thermal barrier coating, which does not otherwise readily bond to the substrate. The thermal barrier coating is then applied over the bond coating. Preferably the thermal barrier coating has enhanced insulative properties and may comprise, for example, but is not limited to, an yttrium stabilized zirconia coating. The thermal barrier coating is preferably plasma sprayed over the bond coating, and the bond coating serves as a bonding agent between the substrate and the thermal barrier coating.

The thickness of the bond coating and the thermal barrier coating depends on the specific section of the engine where the coating is applied, on the alloys comprising the compressor casing, and on the materials which may become molten and contact the protective coating. In the preferred embodiment of the present invention, the bond coating is approximately 0.005 inches thick, and the barrier coating is approximately 0.035 inches thick. This coating configuration will withstand temperatures in excess of 2900° F.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
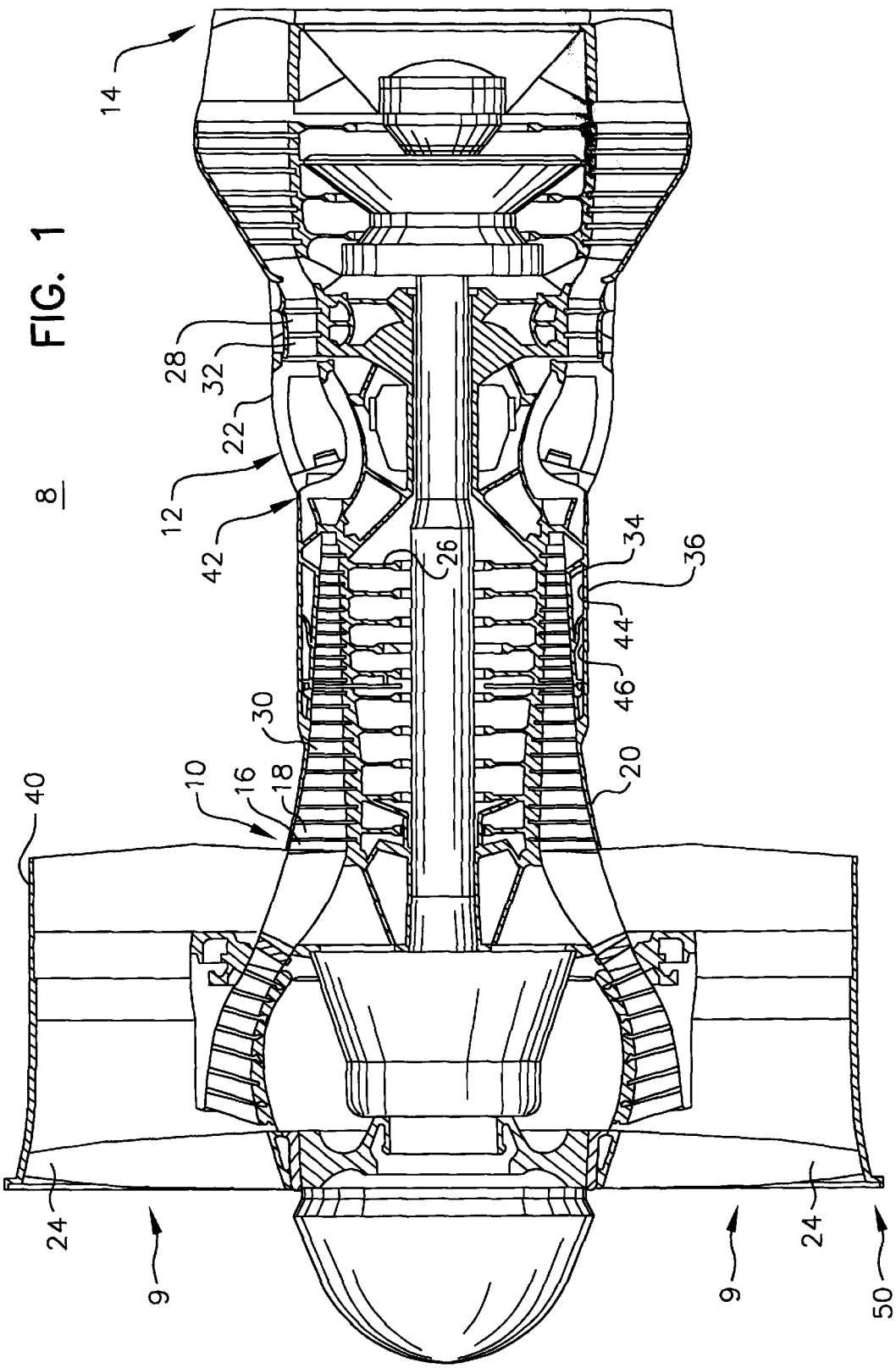
FIG. 1 is a sectional side view of a gas turbine engine showing the internal and external components of the engine.

The present invention is used in a gas turbine engine 8 as shown in FIG. 1A. A protective insulative coating 46 is applied to an inner surface 44 of an outer compressor casing 36, forward of a turbine/burner section 12. The protective coating 46 insulates the compressor casing 36 from any incendiary particles and/or molten material expelled from the core of the gas turbine engine 8 during operation of the engine or incendiary particles that otherwise escape the confines of the inner diffuser casing, the inner diffuser casing being the stationary portion of the turbine engine nearest the rotating compressor blades. But more particularly, the coating 46 of the present invention prevents molten materials from burning through the outer compressor casing 36 during a catastrophic engine failure.

Figure 2:
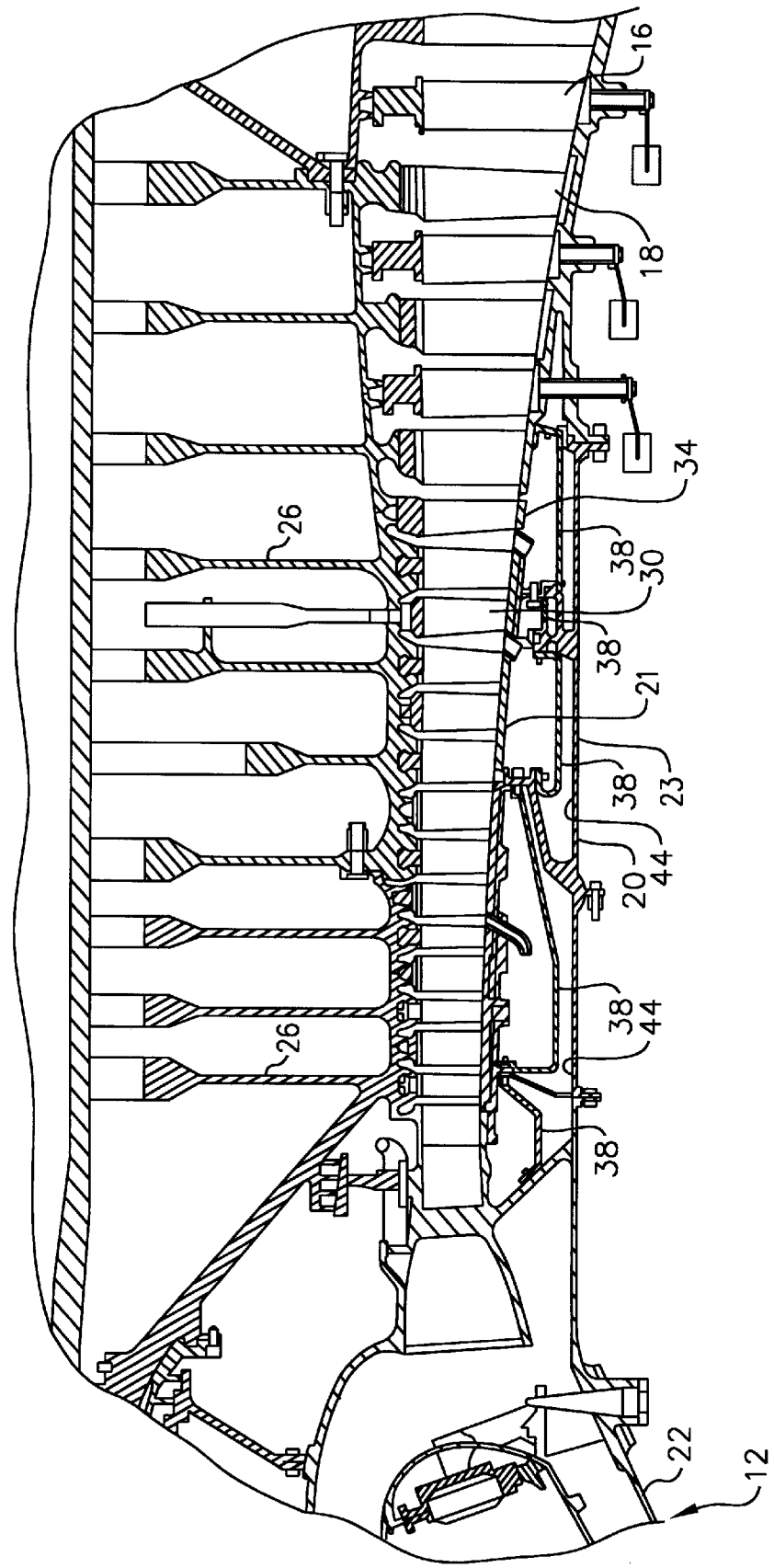
FIG. 2 is a detailed sectional side view of a prior art gas turbine engine, illustrating conventional drip pans disposed for containing molten materials expelled from the engine.

Use of the protective coating 46 reduces or eliminates the need for conventional safety devices or containment structures, including shields (not shown), drip pans 38 (shown in FIG. 2), blankets (not shown) and other safety apparatuses (not shown). The reduction and/or elimination in the number of such safety devices that are required reduces the weight of the turbine engine 8, and hence, reduces the weight of the aircraft. Accordingly, improved efficiency and economy of operation can be achieved with the aircraft on which the present invention is used.

For purposes of describing, the best mode of the present invention, the protective coating 46 will be described as it is applied to the inner surface 44 of the outer compressor casing 36 of a PW 4000 series gas turbine engine. In this regard, the turbine engine 8 is shown with the protective coating 46 of the present invention in place in FIG. 1A, FIG. 1B, FIG. 3, and FIG. 4A and FIG. 4B, and with conventional safety devices (i.e., drip pans 38) in place in FIG. 2. While the present invention is described in connection with its use on a compressor casing, specifically the rearward end 42 of a forward intake section 10 of the PW 4000 series engine, it will be readily apparent to those skilled in the art that the protective coating 46 may be applied to other parts and/or sections of any gas turbine engine to protect and insulate various other substrates from molten or burning materials including coating the inner surface of the inner diffuser casing 21. In addition, the present invention has other uses in the aviation industry that are unrelated to a gas turbine engine 8 and in other industries and technical fields outside aviation. The protective coating 46 of the present invention is applicable anywhere there is a need to insulate a substrate from excessive heat and/or from molten materials that may come to rest directly on the substrate, but for the presence of the protective coating 46.

Various components shown in FIG. 1A require protection from molten materials that may be caused by engine fires. The conventional gas turbine engine 8 generally includes a forward intake section 10 having a forward end 50 and a rearward end 42, a burner/turbine section 12, and an exhaust section 14. The forward intake section 10 includes a titanium fan blade housing 40 surrounding and sealing titanium fan blades 24. Directly behind the fan blades 24, in the order that they would be contacted by an incoming air stream, are nickel alloy inlet guide vanes 16, titanium rotor blades 18, turbine rotor disks 26, and titanium stator blades 30. These components are encased in a titanium compressor casing 20 generally including an inner diffuser casing 21 and an outer diffuser casing 23.

During operation, any of the above-listed components may become damaged (bent or broken) due to fatigue or due to foreign objects entering the engine intake 9. Damage to a particular component may result in the component rubbing against the compressor casing, thereby creating excessive frictional heat; or, if pieces of the component have separated, the pieces may become jammed between other components within the gas turbine engine 8 and/or migrate to other sections of the engine, specifically to the rearward end 42 of the forward intake section 10. Anywhere along the migration path, particles may become jammed and create excessive frictional heat. If, due to frictional heat in any section of the engine, the temperature of a specific titanium particle (or component) increases to or above its ignition temperature, the particle will begin to burn and, if free floating or broken loose from its jammed position, the particle will continue to migrate through the engine 8 until the particle is ejected from the exhaust section 14 of the gas turbine engine 8. If the particle becomes permanently jammed or damages or ignites other components, a complete and catastrophic engine failure may occur.

Generally, burning particles and molten materials that become permanently jammed within a section of the engine will have migrated rearward to the most restrictive section of the turbine engine, i.e., to the rearward end 42 of the forward intake section 10. This portion of the gas turbine engine 8 is best shown in FIG. 1B. In the rearward end 42, the greatest frictional forces generally occur due to the restrictive nature of this section, so that the greatest frictional heat is likely to be generated in this section. In addition, the significant restriction in the rearward end 42 tends to cause accumulation of burning particles and molten materials. In this regard, the area of the compressor casing 20 that is likely to fail or burn through, thereby expelling molten materials outside the engine environment, is the section of the compressor casing surrounding the rearward end 42 of the forward intake section 10.

As a further cause for concern in any engine that has begun to fail, the airflow stream through the gas turbine engine reaches its highest compression state in the rearward end 42. Accordingly, the significant heat of compression accelerates heat buildup and promotes burning of any ignited titanium. As the engine failure progresses, molten materials and burning particles increase the temperature in the rearward end 42 sufficiently to burn through the inner compressor casing 34, and unless protective measures are taken, to then burn through the outer compressor casing 36. Burning particles are then expelled from the engine environment. Accordingly, either convention safety devices or the protective coating of the present invention must be in place to insure the outer compressor casing is not breached by molten materials.

An additional need for the protective coating 46 of the present invention arises from the desire to use titanium and titanium alloys as close to the burner/turbine section as possible. For purposes of reducing the weight of the engine, the more titanium that can be used in place of other heavier alloys, such as nickel alloys, the greater the total weight reduction of the engine that can be achieved. However, the closer to the burner/turbine section 12 that titanium components are located, the higher the probability that the component will reach its ignition temperature, thereby burning and causing a catastrophic engine failure.

Design decisions regarding how close to the burner/ turbine section of the gas turbine engine titanium components can be used are based on the temperature profile of the gas turbine engine 8. However, it is difficult to determine the exact temperature of a specific engine section, in order to determine precisely the cutoff point beyond which titanium components can no longer be used. By providing protective measures in the sections of the engine where the threshold ignition temperature is likely to be achieved, titanium components can be used closer to the burner/turbine section. In the event that the threshold ignition temperature migrates sufficiently to affect titanium components, an engine fire will be contained. Use of a protective coating 46 for this purpose instead of conventional steel drip pans or other containment structures provides substantial weight and bulk reduction benefits, as already noted.

Figure 3:
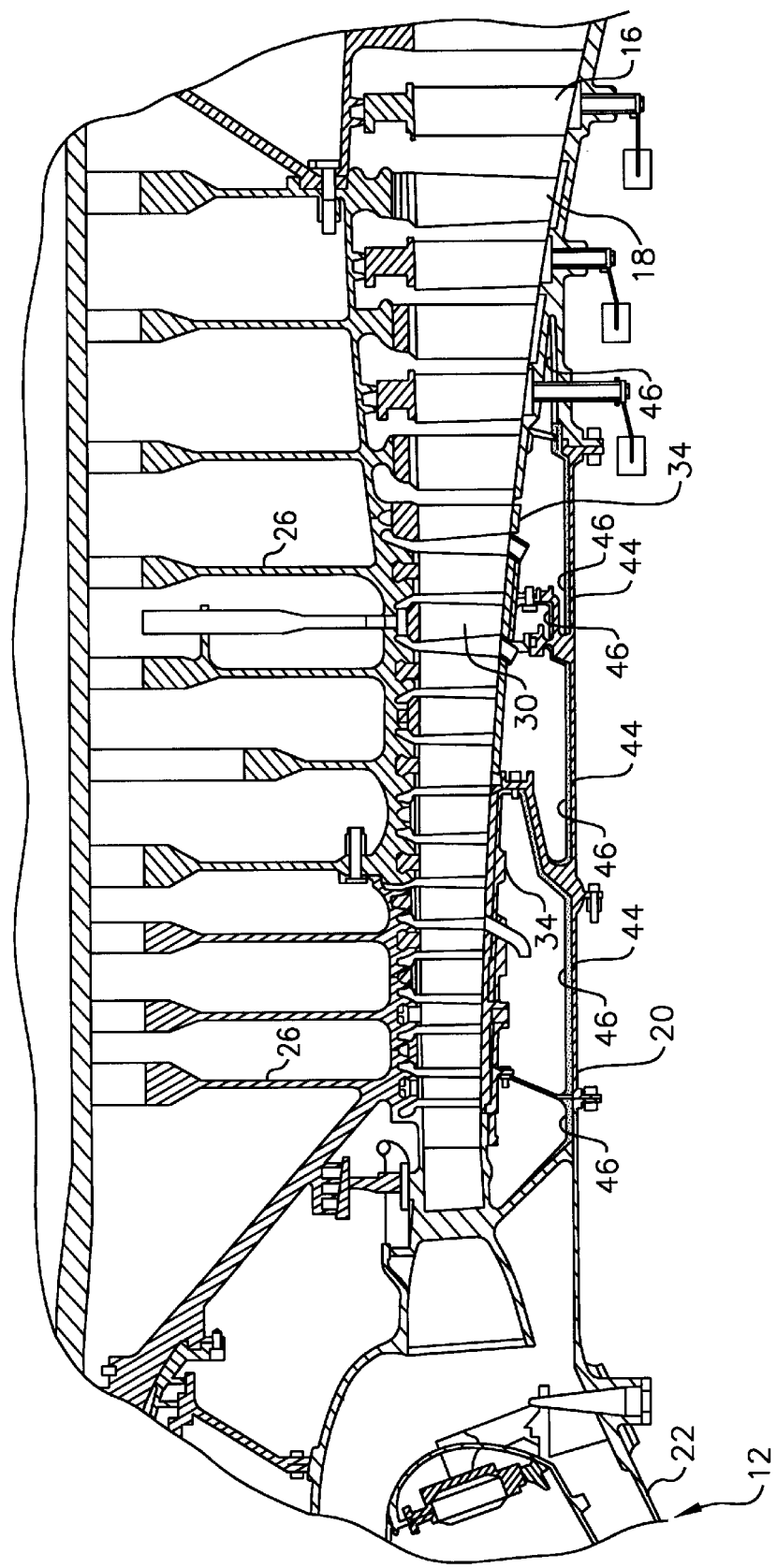
FIG. 3 is a detailed sectional side view of the present invention, showing the protective coating that is applied to the inner surface of the outer compressor casing of a gas turbine engine.

Referring to FIG. 3, there is shown a detailed sectional view of the gas turbine engine 8 shown in FIG. 1, specifically, the rear portion 42 of the forward intake section 10. The protective coating 46 of the present is preferably applied to the inner surface 44 of the outer compressor casing 36. The protective coating 46 may be applied to just the lower extremities, i.e., from the midpoint of one side of the engine around the bottom of the engine, up to the midpoint of the other side of the engine, or, considering the weight advantages of the protective coating as compared to a steel drip pan 38, to the entire inner surface 44 of the outer compressor casing 36. The protective coating 46 may also be applied to other sections of the gas turbine engine, including drip pans 38 (FIG. 2) and compressor casings, to improve safety margins and/or to reduce the weight and mass of these components.

Figure 4A:
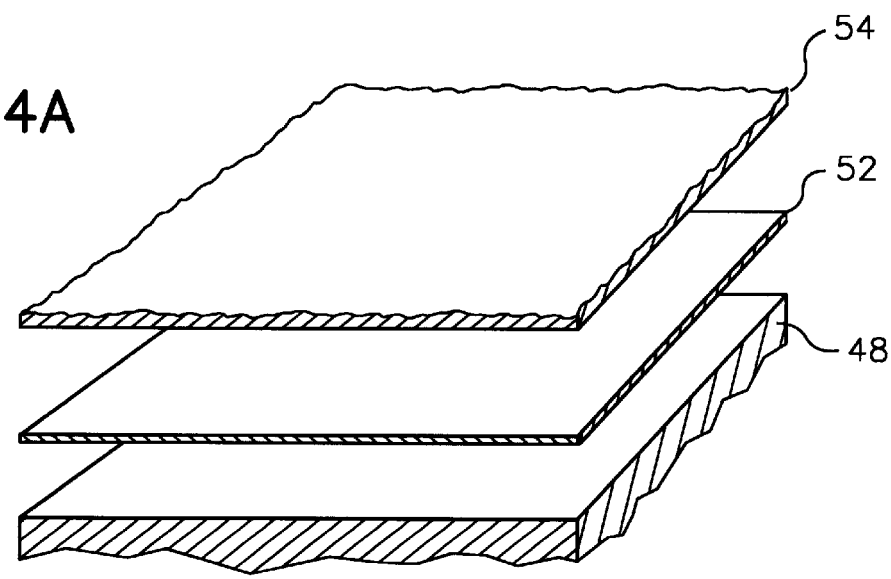
FIG. 4A is an exploded sectional view showing the protective coating of the present invention applied to a substrate.
Figure 4B:
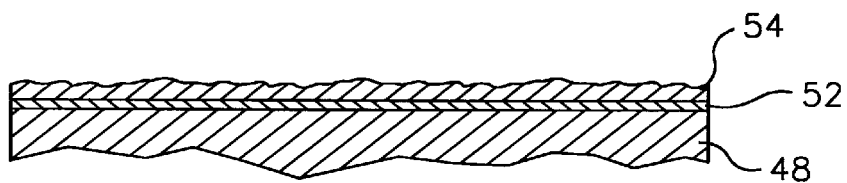
FIG. 4B is an elevational cross-sectional view of the protective coating of the present invention applied to a substrate.

Referring now to FIG. 4A and FIG. 4B, there is shown a detailed view and an exploded view, respectively, of the protective coating 46 of the present invention as applied to a substrate 48. The protective coating 46 of the present invention has good insulative properties and preferably a higher melting temperature than the temperatures associated with either the molten material that may come to rest on the coating 46 or the melting point of the substrate 48. In addition, the protective coating 46 should be non-reactive with the substrate 48 and the molten material likely to come into contact with it. Generally, the materials contained within the engine having the highest melting temperatures are titanium and nickel alloys, and cobalt alloys in the turbine section. The melting temperatures of these materials may exceed 2900° F. Therefore, the protective coating 46 of the present invention preferably has a melting temperature substantially higher than 2900° F.

In one embodiment of the present invention, the protective coating 46 is applied to a titanium substrate, specifically the inner surface 44 of the outer compressor casing 36. The protective coating 46 includes a plasma sprayed, metallic bond coating 52, approximately 0.005 inches thick, and a ceramic top coating 54. The bond coating 52 may be a nickel-aluminum alloy (95% Ni and 5% Al) or a Ni—Co—Cr—Al—Y alloy such as those described in U.S. Patent No.: Re 32,121. Ceramic coatings do not adhere well directly to titanium and titanium alloys, and bond coating 52 acts as a bonding agent between the ceramic top coating 54 and the titanium substrate 48.

The bond coating 52 is plasma oversprayed with the ceramic top coating 54, which preferably comprises an yttria stabilized zirconia, approximately 0.035 inches thick. While the best result for the ceramic top coating 54 were obtained using a combination of yttria and zirconium, tests were also conducted using top coatings comprising molybdenum and cobalt tungsten carbide. These materials, while inferior to the yttria stabilized zirconia, can be used within the scope of the present invention and may be better suited to coating substrates other than those specifically evaluated. Zirconia partially or fully stabilized with either yttria or magnesia is preferred.

While one embodiment of the present invention uses a specific bond coating 52 (Ni—Co—Cr—Al—Y) and a specific top coating 54 (yttria stabilized zirconia) having specific thicknesses (0.005 inches and 0.035 inches respectively) as applied to a specific substrate (Ti-6-2-42), it will be readily apparent to those skilled in the art that different compositions and thicknesses for the bond coating 52 and/or the top coating 54 can be used for application to different substrates 48. In addition, the ceramic top coating 54 may readily adhere to some substrates and not require a bond coating 52. The advantage of the present invention is derived from the insulative/non-reactive attributes of the protective coating 46. The protective coating 46 may add as little as 5 pounds to a large gas turbine engine—significantly less than the approximately 85 to 100 pounds that would result if conventional drip pans 38 were used instead.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. In a gas turbine engine, having a substrate surrounding at least a portion of the engine, the substrate having a solid inner surface and an outer surface, a method for preventing a burning material expelled from the engine from penetrating the substrate, comprising the steps of:

spraying a bond coating directly onto the inner surface of the substrate; and applying an insulative thermal barrier coating onto the bond coating, the barrier coating having a melting temperature higher than an expected temperature of the burning material and higher than a melting temperature of the substrate.

2. The method of claim 1, wherein the bond coating comprises a Ni—Co—Cr—Al—Y alloy.

3. The method of claim 2, wherein the insulative thermal barrier coating comprises a stabilized zirconia coating.

4. The method of claim 3 wherein the substrate comprises titanium and titanium alloys and has a melting temperature below the thermal barrier coating.

5. In a gas turbine engine, including an inner diffuser casing and an outer engine casing, the outer engine casing having an inner surface and an outer surface, a method for preventing a burning material expelled from within the inner diffuser casing from penetrating the outer engine casing, comprising the steps of:

applying a bond coating directly onto the inner surface of the substrate; and applying an insulative thermal barrier coating onto the bond coating, the barrier coating having a melting temperature higher than an expected temperature of the burning material and higher than a melting temperature of the outer engine casing.

6. The method of claim 5, wherein the bond coating comprises a Ni—Co—Cr—Al—Y alloy.

7. The method of claim 6, wherein the thermal barrier coating comprises a stabilized zirconia coating.

8. The method of claim 7, wherein the outer engine casing comprises titanium and titanium alloys and has a melting temperature below the bond coating.

9. Apparatus for preventing burning materials from escaping a gas turbine engine comprising:

a substrate for surrounding at least a portion of the engine, the substrate having an inner surface and an outer surface; and a protective insulative coating applied to the inner surface of the substrate, the protective coating having a melting temperature higher than an expected temperature of the burning material and higher than a melting temperature of the substrate, and having thermally insulative properties.

10. The apparatus of claim 9, wherein the protective insulative coating comprises a bond coating oversprayed with an insulative thermal barrier coating, the insulating thermal barrier coating having a higher melting temperature than the expected temperature of the burning material and higher than the melting temperature of the substrate.

11. The apparatus of claim 10, wherein the bond coating comprises a Ni—Co—Cr—Al—Y alloy.

12. The apparatus of claim 10, wherein the insulative thermal barrier coating comprises a stabilized zirconia coating.

13. The apparatus of claim 9, wherein the substrate comprises an outer compressor casing, the outer surface of the substrate defining an outer circumference of the gas turbine engine, the outer compressor casing comprising titanium and titanium alloys.

14. Apparatus for preventing a burning materials from escaping a gas turbine engine comprising:

an inner diffuser casing and an outer engine casing, the outer engine casing having an inner surface and an outer surface;

a substrate for surrounding a portion of the inner diffuser casing, the substrate having an inner surface spaced apart from the inner diffuser casing and an outer surface; and a protective insulative coating applied directly to the inner surface of the substrate, the protective coating having a melting temperature higher than an expected temperature of the burning material and higher than a melting temperature of the substrate, and having thermally insulative properties.

15. The apparatus of claim 14, wherein the protective insulative coating comprises a bond coating oversprayed with an insulative thermal barrier coating, the insulative thermal barrier coating having a higher melting temperature than the expected temperature of the burning material and higher than the melting temperature of the substrate.

16. The apparatus of claim 15, wherein the bond coating comprises a Ni—Co—Cr—Al—Y alloy.

17. The apparatus of claim 15, wherein the thermal barrier coating comprises a stabilized zirconia coating.

18. The apparatus of claim 14, wherein the substrate comprises the outer compressor casing, the outer surface of the substrate defining an outer circumference of the gas turbine engine, the compressor casing comprising titanium and titanium alloys.

19. The method of claim 1, wherein the total combined depth of the bond coating and the insulative barrier coating is less than two hundred thousandths of an inch (0.200 in.).

20. The apparatus of claim 14, wherein the total combined depth of the protective coating is less than two hundred thousandths of an inch (0.200 in.).

\* \* \* \* \*